(12) United States Patent
Xu et al.

(10) Patent No.: US 11,311,909 B2
(45) Date of Patent: Apr. 26, 2022

(54) DEVICE AND METHOD FOR REDUCING AND HOMOGENIZING RESIDUAL STRESS OF A COMPONENT BY ARRAY OF HIGH-ENERGY ELASTIC WAVES

(71) Applicant: BEIJING INSTITUTE OF TECHNOLOGY, Beijing (CN)

(72) Inventors: Chunguang Xu, Beijing (CN); Shuangyi Li, Beijing (CN); Yuren Lu, Beijing (CN); Peng Yin, Beijing (CN); Dezhi Li, Beijing (CN); Ruili Jia, Beijing (CN); Wenyuan Song, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 34 days.

(21) Appl. No.: 16/991,372

(22) Filed: Aug. 12, 2020

(65) Prior Publication Data

US 2021/0086309 A1    Mar. 25, 2021

(30) Foreign Application Priority Data

Sep. 24, 2019 (CN) .......................... 201910906532.4

(51) Int. Cl.
| | | |
|---|---|---|
| B06B 1/20 | (2006.01) | |
| B23K 31/00 | (2006.01) | |
| C22F 3/00 | (2006.01) | |
| B06B 1/02 | (2006.01) | |
| C21D 10/00 | (2006.01) | |

(52) U.S. Cl.
CPC .................. *B06B 1/20* (2013.01); *B06B 1/02* (2013.01); *B23K 31/003* (2013.01); *C22F 3/00* (2013.01); *C21D 10/00* (2013.01)

(58) Field of Classification Search
None
See application file for complete search history.

(56) References Cited

FOREIGN PATENT DOCUMENTS

CN    110157894 A    8/2019

OTHER PUBLICATIONS

Ghanem et al, "Noninvasive acoustic manipulation of objects in a living body", 2020. PNAS, vol. 117, No. 29, pp. 16848-16855 (Year: 2020).*

* cited by examiner

*Primary Examiner* — Hovhannes Baghdasaryan
(74) *Attorney, Agent, or Firm* — John A. Miller; Shumaker, Loop & Kendrick, LLP

(57) ABSTRACT

A device and method for reducing and homogenizing residual stress of a component by an array of high-energy elastic waves. The device includes a tubular body consisting of at least two elements, multiple first through holes and a clamping device provided on an outer side of the tubular body. Exciters are connected with exciting wedges so that an end face of each of the exciting wedges is closely coupled to a surface of the component. A connection portion is coupled to an emitting end of each of the exciters, where the axis of the emitting end coincides with a normal line at a pressed surface of the component A multi-channel signal amplifier is electrically connected to each of the exciters and a multi-channel excitation control module is electrically connected to the multi-channel signal amplifier.

9 Claims, 2 Drawing Sheets

DEVICE AND METHOD FOR REDUCING AND HOMOGENIZING RESIDUAL STRESS OF A COMPONENT BY ARRAY OF HIGH-ENERGY ELASTIC WAVES

CROSS-REFERENCE TO RELATED APPLICATION

This application claims priority to China Patent Application Serial No. 201910906532.4 filed Sep. 24, 2019.

BACKGROUND

Field

The present disclosure relates to the technical field of material performance, and in particular, to a device and a method for reducing and homogenizing residual stress of a component by array of high-energy elastic waves.

Discussion of the Related Art

Nowadays, aluminum alloy materials are widely used in aviation, aerospace, hydropower, thermal power, compressors and other fields due to their excellent mechanical properties such as low density, light weight, good rigidity and high strength. For the welding and milling processes commonly used in large aluminum alloy components, due to the uneven temperature gradients, plastic deformation and phase changes during processing, residual stress will be introduced into the component, which will cause it to deform and affect its mechanical properties. Therefore, in order to ensure the performance and service life of components, it is necessary to reduce and homogenize the residual stress caused by welding and milling in large aluminum alloy components.

There are many methods in the prior art to reduce the residual stress of metal materials, such as natural aging, vibration impaction, annealing, tempering and likes. The natural aging method requires a long time, usually in months or years, and is not suitable for engineering applications that is tight on processing time. The vibration impaction method is mostly used for plate components and disk components with regular structure and smooth surface, and it has poor performance on reducing of the residual stress of components with intricate structures, such as tanks, (crank) shafts in the fields of aerospace, hydropower, thermal power, compressors and likes; it also requires a relatively long time and tedious processing. The artificial aging methods such as the annealing, tempering and the like have requirements for the control operation of the fire, and it needs at least three to five days on time scale, which makes it unsuitable for engineering applications that have high requirements both on time and quality. A patent application whose publication number is CN109234653A and whose name is a method of reducing the residual stress of large and complex aluminum alloy die forging, provides a method for reducing the residual stress of the forging by cold pressing. This method reduces and homogenizes the residual stress by stretching the forgings. It is not suitable for welded components processed by welding process, nor for components with precise requirements on the external dimensions of the structure.

The above-mentioned existing techniques for reducing residual stress either are not suitable for engineering applications that has high requirement on time scale, or are not suitable for components with more complicated structures such as tanks, (crank) shafts, and likes, or are not suitable for components that have been processed by welding, milling and other processes. Even after reduction and regulation by these techniques, problems such as uneven distribution of residual stress may occur, and the internal stress of such components cannot be homogenized.

SUMMARY

The present disclosure provides a device and a method for reducing and homogenizing residual stress by array of high-energy elastic waves, so as to solve the outstanding problem that the prior art cannot reduce and homogenize the residual stress of a component with an intricate structure and a complex stress distribution, and cannot control the overall deformation of the component.

A first aspect of the present disclosure is to provide a device for reducing and homogenizing residual stress of a component by array of high-energy elastic waves, including:

a tubular body consisting of at least two elements connected in a longitudinal section, the tubular body being arranged around a component to be regulated, wherein multiple first through holes are provided on sidewall of the tubular body along a circumferential direction and forms an array arrangement, and a clamping device pressing against outer surface of the tubular body is provided on outer side of the tubular body;

exciting wedges configured to be embedded at the first through holes, wherein an end face of each of the exciting wedges facing interior of the tubular body is closely coupled to a surface of the component to be regulated, an end face of each of the exciting wedges facing the first through hole is a connection portion, which has a concave surface and a connection bar protruding from center of the concave surface;

exciters connected by at least parts of the exciting wedges correspondingly, wherein an emitting end of each of the exciters is coupled to the concave surface and the connection bar of the connection portion via a coupling agent, a blind hole to be connected with the connection bar is provided at a center of the emitting end, an axis of the emitting end of each of the exciters coincides with a normal line at a corresponding pressed surface of the component to be regulated; and a multi-channel signal amplifier electrically connected to each of the exciters 40, configured for fidelity amplifying emitted signals and received signals, and a multi-channel excitation control module electrically connected to the multi-channel signal amplifier, configured for controlling the exciters to emit the emitted signals and obtain the received signals.

Compared with the prior art, before a regulation operation, the component to be regulated can be placed in the split-type tubular body according to the embodiment of the present disclosure, then the inner walls of elements of the tubular body are tightly pressed against the component to be regulated via the clamping device situated on outer side of the tubular body. Multiple first through holes are provided on the sidewall of the tubular body along the circumferential direction and forms an array arrangement, so that emitting ends of the corresponding the exciters pass through the corresponding first through holes and couple to the connection portions of the corresponding exciting wedges. Such array arrangement can reduce and homogenize the residual stress of each regulation region of the component to be regulated in a comprehensive manner. In addition, the axis of the emitting end of each exciter coincides with the normal at the corresponding pressed surface of the component to be regulated so that the high-energy elastic waves emitted by the exciter is perpendicularly introduce to the surface and interior of the component to be regulated, achieving an optimum energy impact effect, in particular to the component having a large and concentrated residual stress caused by welding, milling and other processes. The first through holes can be occupied completely or selectively. The number and distribution of occupied first through holes can be determined according to the magnitude and overall distribution of the residual stress of component to be regulated detected by the pre-detection. The frequency and power of the high-energy elastic waves emitted by the exciter corresponding to each of occupied first through hole can also be determined based on the magnitude of the residual stress on the surface and interior of the component to be regulated tightly pressed against to the end face of the corresponding exiting wedge. The multi-channel signal amplifier electrically connected to each of the exciters and the multi-channel excitation control module electrically connected to the multi-channel signal amplifier can pre-set control frequency, control duration, acoustic energy and likes of each channel based on magnitudes of residual stresses of the parts of component to be regulated corresponding to the different exciters. In this way, the residual stress of the entire component to be regulated with an intricate structure, a complex stress distribution, and a larger magnitude residual stress is reduced and homogenized, the reduction and homogenization effects are particularly remarkable for components that have been introduced more residuals stress to surface and interior by welding and milling processes. In addition, since the clamping device always presses the component to be regulated situated in the tubular body by pressing the tubular body during the regulation process, which at the same time realizes the control of the overall deformation of the component to be regulated during the regulation process, which control of the deformation is particularly remarkable for especially the component to be regulated made of aluminum alloy that is more easily deformed.

In some embodiments, a space is provided between two adjacent elements of the elements.

When the shape and structure of different components to be regulated are basically the same, but are different in the diameter or the length and width of the cross-section, same pressing effect can be realized by changing the space between the elements via the clamping device without re-customizing the tubular body.

In some embodiments, the clamping device comprises at least two sets of pressing brackets and bolts, and sides of the pressing brackets facing an outer wall of the tubular body are provided with a plurality of threaded holes matching the bolts.

When the shape and structure of different components to be regulated are basically the same, but are different in the diameter or the length and width of the cross-section, great pressing effect can be realized over different components by cooperating the sets of pressing brackets.

In some embodiments, the tubular body is provided on an operation deck, the pressing brackets are right-angle brackets, one straight side of each of the right-angle brackets is provided with threaded holes matched with and connected to the bolts, and the other straight side of each of the right-angle brackets is supported and fixedly connected to the operation deck.

The right-angle brackets have better mechanical stability and can provide a more firmly support as to achieve better pressing effect. While a flat operation deck facilitates the right-angle brackets provide a support in a more reliable manner.

In some embodiments, the sets of pressing brackets are evenly arranged around the tubular body; and/or the elements of the tubular body have a central symmetrical arrangement.

Such arrangement produces a firmer and more uniform pressing effect, and facilitates the uniform processing and production of the tubular body, reducing the production cost and difficulty.

In some embodiments, the connection portion is a structure in which outer edge is protruding and inner part is recessed, the outer edge is arranged around an outer periphery of the first through hole, and the outer edge is evenly provided with a plurality of second through holes, so that the exciting wedges are fixedly connected to an inner wall of the tubular body via fasteners.

Such arrangement can not only conduct sound waves well, but also realizes a good connection, of which structure is reliable and simple, resulting low manufacturing cost or customizing cost.

In some embodiments, curvature of the end face of each of the exciting wedges facing the component to be regulated and curvature of the surface, correspondingly coupled thereto, of the component to be regulated are the same.

Such arrangement ensures a good coupling state between the end face of exciting wedge and the surface of the corresponding component to be regulated, so that the two can be coupled more closely.

In some embodiments, a coupling agent made of a high-temperature grease material is provided between the end face of each of the exciting wedges facing the interior of the tubular body and the surface of the component to be regulated; and/or the coupling agent made of the high-temperature grease material is provided between the emitting end of each of the exciters and the concave surface of the connection portion.

The high-temperature grease contains a high concentration of PTFE lubricating particles, which has the advantages of high temperature resistance, high pressure resistance, high capacity, high durability, low volatility, high water resistance, high mechanical stability, and high corrosion resistance.

In some embodiments, a sound wave frequency of each of the exciters is greater than 0.1 KHz; and/or a sound wave power of each of exciters is greater than 0.1 W.

As a result, it can be ensured that high-energy elastic waves output energy with sufficient impact strength.

A second aspect of the present disclosure is to provides a method for reducing and homogenizing residual stress of a component by array of high-energy elastic waves, which is based on the device for reducing and homogenizing residual stress of a component by array of high-energy elastic waves claimed according to any one of claims 1 to 9, including following steps:

placing the component to be regulated that has been pre-detected for the magnitude and distribution of residual stress on the operation deck;

selecting, according to the pre-detection result of the component to be regulated, first through holes corresponding to the regulation regions of the component to be regulated, selecting the corresponding exciters, and installing the exciting wedges corresponding to the exciters at the first through holes of the tubular body, respectively;

arranging the tubular body around the component to be regulated, closely coupling the end faces of the exciting wedges towards the component to be regulated to surfaces of the corresponding regulation regions of the component to be regulated, and pressing the two against each other via the clamping device;

coupling the emitting ends of the exciters corresponding to the corresponding regulation regions of the component to be regulated to the connection portions of the exciting wedges corresponding thereto;

connecting each channel of the multi-channel signal amplifier to one of the exciters corresponding thereto and one channel of the multi-channel excitation control module corresponding thereto, respectively;

activating the multi-channel excitation control module, the multi-channel signal amplifier and the exciters; and after regulation, shutting down the multi-channel excitation control module, the multi-channel signal amplifier and the exciters, and releasing pressing of the clamping device to remove the regulated component.

It should be appreciated that the above general description and the following detailed description are only exemplary and do not intend to limit the present disclosure.

REFERENCE SIGNS

Figure 1:
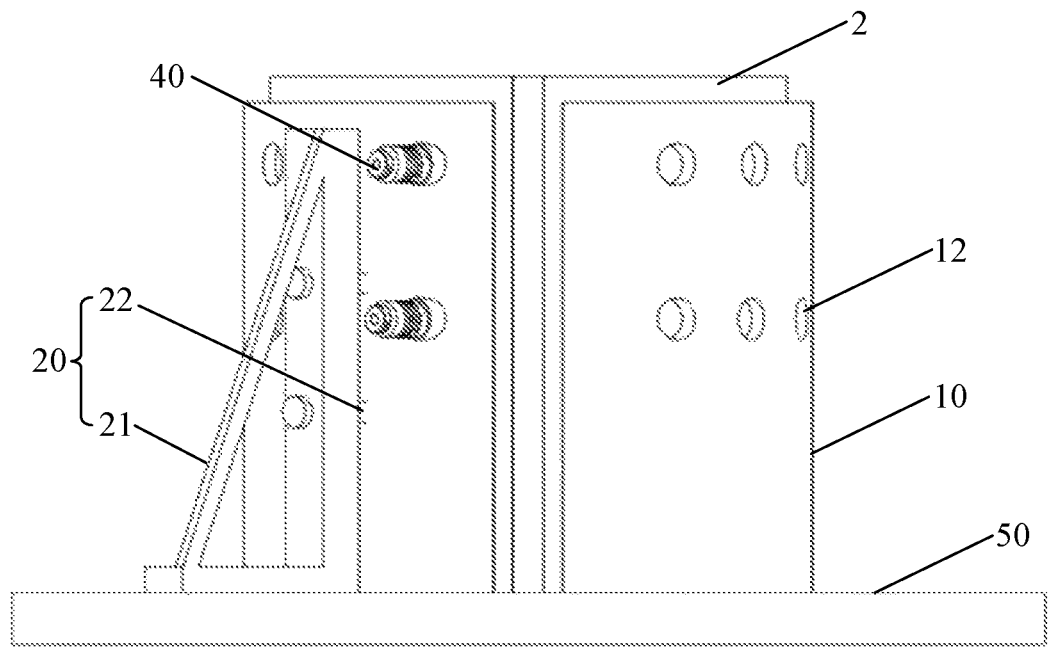
FIG. 1 is a perspective view of a partial structure of a device for reducing and homogenizing residual stress of a component by array of high-energy elastic waves according to an embodiment of the present disclosure.
Figure 2:
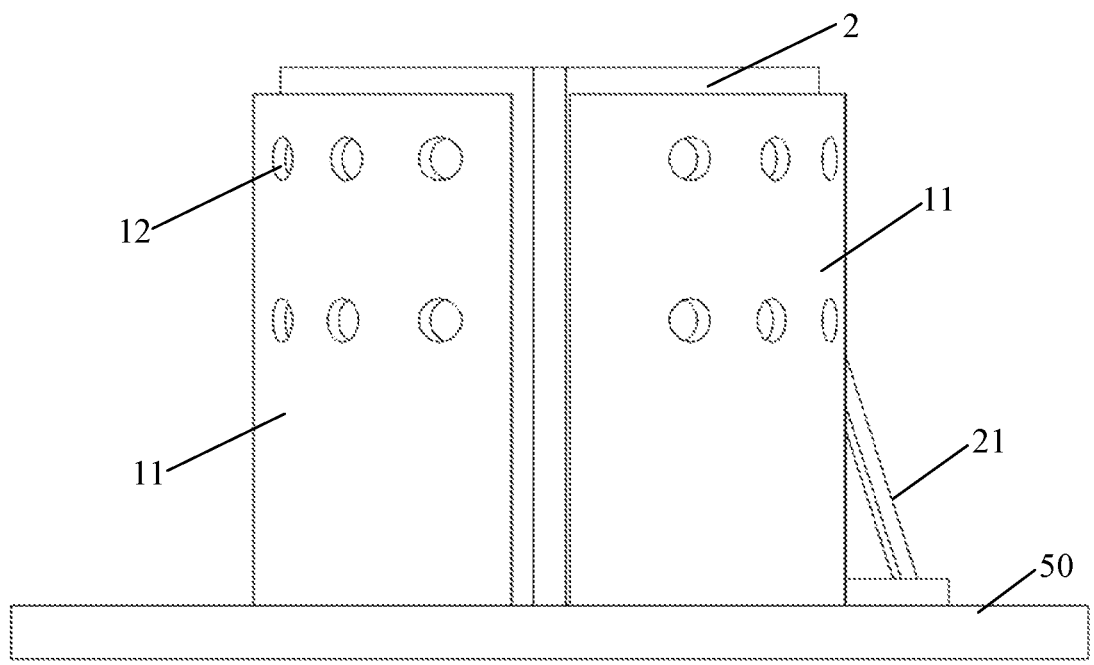
FIG. 2 is a further perspective view of the partial structure of the device for reducing and homogenizing residual stress of a component by array of high-energy elastic waves according to the embodiment of the present disclosure.
Figure 3:
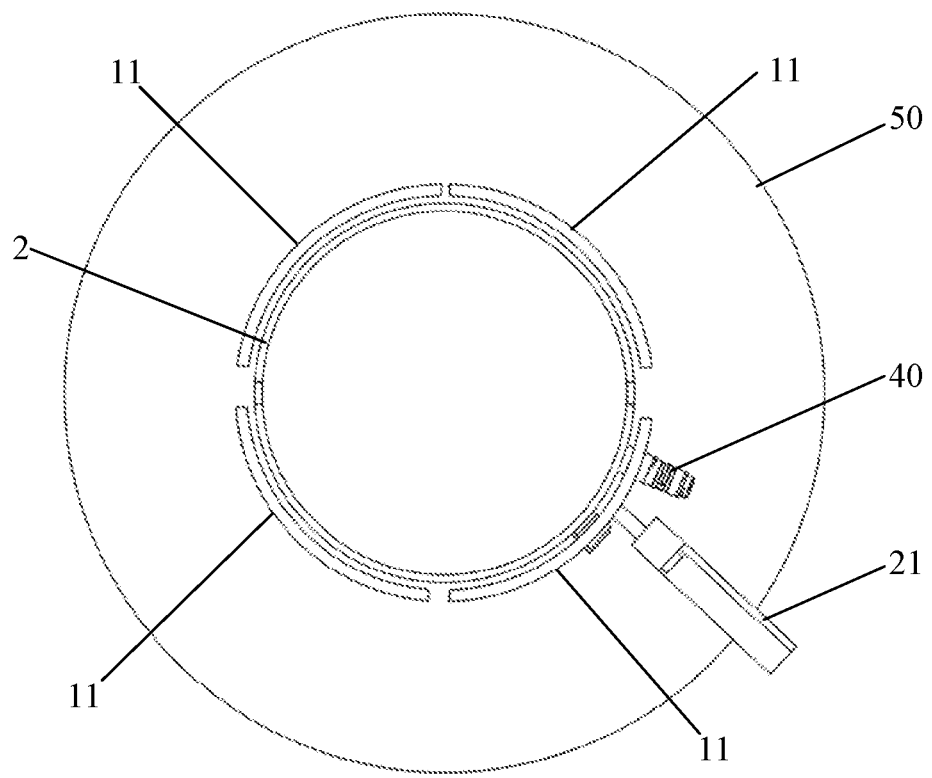
FIG. 3 is a plane view of the partial structure of the device for reducing and homogenizing residual stress of a component by array of high-energy elastic waves according to the embodiment of the present disclosure.

10—tubular body;
11—element;
12—first through hole;
20—clamping device;
21—right-angle bracket;
22—bolt;
30—exciting wedge;
31—end face;
32—connection portion;
321—second through hole;
322—connection bar;
323—concave surface;
40—exciter;
50—operation deck;
2—component to be regulated.

The figures herein are incorporated into the description and constitute a part of the description, illustrate embodiments consistent with the present disclosure, and serve to explain the principles of the present disclosure together with the description.

DETAILED DESCRIPTION OF THE EMBODIMENTS

The following further describes the present disclosure in detail by specific embodiments with reference to the accompanying drawings.

As shown in FIG. 1 to FIG. 4, an embodiment of the present disclosure provides a device and a method for reducing and homogenizing residual stress of a component by array of high-energy elastic waves. The device includes a split-type tubular body 10, which consists of at least two elements 11. The two adjacent elements 11 are connected in a longitudinal section. The tubular body 10 is arranged to surround a component 2 to be regulated. The inner wall of the tubular body 10 may be provided with multiple first through holes 12 along the circumferential direction, and the multiple first through holes 12 are arranged to form an array, which can reduce and homogenize the residual stress of each regulation region of the component 2 to be regulated in a more comprehensive manner. The number and distribution of the first through holes 12 can be determined according to the magnitude and distribution of the residual stress of the component 2 to be regulated. A clamping device 20 pressing against the outer surface of the tubular body 10 is provided on outer side of the tubular body 10, and the examples of the clamping device 20 may be a tightening member, a locking member, and likes. Exciting wedges 30 and exciters 40 correspondingly coupled to the exciting wedges 30 can be embedded at the first through holes 12. An end face 31 of the exciting wedge 30 facing interior of the tubular body 10 is closely coupled with the surface of the component 2 to be regulated via a coupling agent. An example of the coupling agent suitable for the device according to the present disclosure may be a high-temperature grease containing a high concentration of PTFE lubricating particles, which has the advantages of high temperature resistance, high pressure resistance, high capacity, high durability, low volatility, high water resistance, high mechanical stability, high corrosion resistance and likes. The other end face of the exciting wedge 30 opposing the end face 31 is a connection portion 32. The connection portion 32 has a concave surface 323 and a connection bar 322 protruding from the center of the concave surface 323. An emitting end of the exciter 40 is coupled to the concave surface 323 and the connection bar 322 of the connection portion 32 via the coupling agent. The center of the emitting end has a blind hole, and the blind hole can be firmly connected to the connection bar 322. The axis of the emitting end of the exciter 40 coincides with the normal line at the corresponding pressed surface of the component 2 to be regulated so that the high-energy elastic waves emitted by the exciter 40 is perpendicularly introduced to the surface and interior of the component 2 to be regulated, achieving an optimum energy impact effect, in particular for the component having a large and concentrated residual stress caused by welding, milling and other processes.

The device according to the embodiment of the present disclosure may also include a multi-channel signal amplifier electrically connected to the exciters 40 for fidelity amplifying the emitted signals and the received signals, and a multi-channel excitation control module electrically connected to the multi-channel signal amplifier for controlling the exciters 40 to emit the emitted signals and obtain the received signals. In addition, before a regulation operation to the component 2 to be regulated, a multi-directional residual stress detecting and monitoring system is adopted to pre-detect the magnitude and distribution of residual stress in the component to be regulated, and a number and distribution of the exciters 40 of the device according to the present disclosure and the power, sound wave frequency, energy intensity and regulation duration of each exciter can be specifically set according to the pre-detection results of the component 2 to be regulated. In addition, it should be noted that the residual stress of the component 2 to be regulated of the embodiments of the present disclosure mainly includes the intrinsic residual stress and the residual stress introduced by processing such as welding and milling. The intrinsic residual stress mainly originates from its blank forming process, for example, caused by thermal imbalance during casting, forging or rolling processes. The welding residual stress mainly is caused by the heat energy concentration and unbalance in the welding process and formed in the welding area; while the milling residual stress is mainly caused by an uneven plastic deformation of the material during the milling process, resulting in a non-uniform volume change, in which different amount of compression and elongation occur in the surface and interior of the material, thereby retaining residual stress. The shape of the tubular body may be, for example, cylindrical, cubic or irregular, which can be determined according to the profile and structural characteristics of the component 2 to be regulated and thus are not limited herein.

Compared with the prior art, before a regulation operation, the component to be regulated can be placed in the split-type tubular body according to the embodiment of the present disclosure, then the inner walls of elements of the tubular body are closely pressed against the component to be regulated via the clamping device situated on outer side of the tubular body in such a way that the axis of the emitting end of each exciter coincides with the normal line at the corresponding pressed surface of the component to be regulated so that the high-energy elastic waves emitted by the exciter is perpendicularly introduced to the surface and interior of the component to be regulated, achieving an optimum energy impact effect, in particular for the component having a large and concentrated residual stress caused by welding, milling and other processes. The first through holes can be occupied completely or selectively. The number and distribution of occupied first through holes can be determined according to the magnitude and overall distribution of the residual stress of the component to be regulated that are detected by the pre-detection. The frequency and power of the high-energy elastic waves emitted by the exciter corresponding to each of the occupied first through holes can also be determined based on the magnitude of the residual stress on the surface and interior of the component to be regulated that is closely pressed against the end face of the corresponding exiting wedge. The multi-channel signal amplifier electrically connected to each of the exciters and the multi-channel excitation control module electrically connected to the multi-channel signal amplifier can pre-set control frequency, control duration, acoustic energy and likes of each channel based on magnitudes of residual stresses of parts of the component to be regulated that correspond to the different exciters. In this way, the residual stress of the entire component to be regulated with an intricate structure, a complex stress distribution, and a larger magnitude residual stress is reduced and homogenized, and the reduction and homogenization effects are particularly remarkable for components that have been introduced more residuals stress to surface and interior by welding and milling processes. In addition, since the clamping device always presses against the component to be regulated situated in the tubular body by pressing against the tubular body during the regulation process, it realizes good control of the overall deformation of the component to be regulated during the regulation process, which makes it difficult to deform and has remarkable deformation control effects particularly for the component to be regulated that is made of aluminum alloy and is more easily deformed.

In some embodiments, space may be provided between two adjacent elements 11. When the shape and structure of different components 2 to be regulated are basically the same, but are different in the diameter or the length and width of the cross-section, same pressing effect can be realized by changing the space between the elements via the clamping device 20 without re-customizing the tubular body 10.

Figure 4:
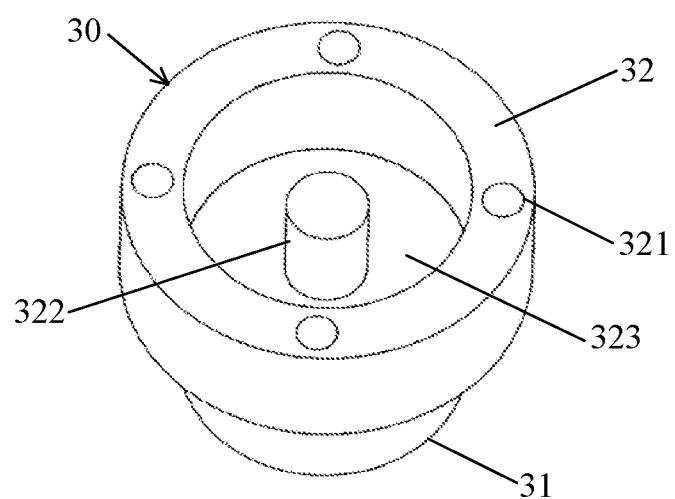
FIG. 4 is a structural schematic diagram of the exciting wedge according to an embodiment of the present disclosure.

As shown in FIG. 4, the connection portion 32 may be a structure in which its outer edge is protruding and its inner part is recessed. The outer edge is arranged around the outer periphery of the corresponding first through hole 12, and the outer edge is evenly provided with a plurality of second through holes 321, so that the exciting wedges 30 are fixedly connected to the inner wall of the tubular body 10 by fasteners through the second through holes 321. Such arrangement can not only conduct sound waves well, but also realizes a good connection, of which structure is reliable and simple, resulting low manufacturing cost or customizing cost. The fasteners may be, for example, bolts, screws, or snaps; the second through holes 321 may be threaded holes or unthreaded holes, and the first through holes 12 may be unthreaded holes. In some embodiments, in order to ensure a good coupling state between the end face 31 of the exciting wedge 30 and the surface of the corresponding component 2 to be regulated, the curvature of the end face 31 of the exciting wedge 30 facing the component 2 to be regulated and the curvature of the surface of the component 2 to be regulated correspondingly coupled thereto may be the same, so that the two can be coupled more closely.

In some embodiments, the clamping device 20 may include at least two sets of pressing brackets and bolts 22, and the sides of the pressing brackets facing the outer wall of the tubular body 10 may be provided with a plurality of threaded holes matching the bolts 22, so that each set of pressing brackets cooperate together to press tubular body 10. Such arrangement can realize a great pressing effect in the case where the shape and structure of different components 2 to be regulated are basically the same, but are different in the diameter or the length and width of the cross-section. In some embodiments, in order to have a firmer and more uniform pressing effect, the multiple sets of pressing brackets can be evenly arranged around the tubular body 10.

Furthermore, the embodiment of the present disclosure may further include an operation deck 50 on which the tubular body 10 may be arranged, and the operation deck 50 may be, for example, a chassis, a base and likes, and its shape is not limited herein. The pressing bracket can be a right-angle bracket 21, which has better mechanical stability and can provide a more firmly support so as to achieve better pressing effect. One straight side of the right-angle bracket 21 is provided with threaded holes matched with and connected to the bolts 22, which may be provided toward the outer side wall of the tubular body 50, and the other straight side thereof can be supported and fixedly connected to the operation deck 50. The flat operation deck 50 facilitates the right-angle brackets 21 to provide a support in a more reliable manner.

In order to have a firmer and more uniform pressing effect, and facilitate the uniform processing and production of the tubular body, reducing the production cost and difficulty, the elements 11 of the tubular body 10 have a central symmetrical arrangement. In some embodiments, four elements are provided, and the cross-section of each element is a quarter arc or has a right-angle shape. In order to ensure that the high-energy elastic waves have sufficient impact strength, the sound wave frequency of each exciter 40 should be greater than 0.1 KHz, and the sound wave power of each exciter 40 should be greater than 0.1 W.

The present disclosure provides a method for reducing and homogenizing residual stress of a component by array of high-energy elastic waves, which includes steps S1 to S7.

At step S1, the component to be regulated that has been pre-detected for the magnitude and distribution of residual stress is placed on the operation deck.

At step S2, according to the pre-detection result of the component to be regulated, first through holes corresponding to the regulation regions of the component to be regulated are selected and corresponding exciters are selected, and exciting wedges that are corresponding to the exciters are then installed at the first through holes of the tubular body, respectively.

At step S3, the tubular body is arranged around the component to be regulated, end faces of the exciting wedges facing the component to be regulated are closely coupled to surfaces of the corresponding regulation regions of the component to be regulated, and the two are then pressed against each other via the clamping device.

At step S4, the emitting ends of the exciters corresponding to the regulation regions of the component to be regulated are coupled to the connection portions of the exciting wedges corresponding thereto.

At step S5, each channel of the multi-channel signal amplifier is connected correspondingly to one of the exciters corresponding thereto and one channel of the multi-channel excitation control module corresponding thereto, respectively.

At step S6, the multi-channel excitation control module, the multi-channel signal amplifier and the exciters are activated.

At step S7, after regulation, the multi-channel excitation control module, the multi-channel signal amplifier and the exciters are shut down, and the pressing of the clamping device is released to remove the regulated component.

In this way, the residual stress of the entire component to be regulated with an intricate structure, a complex stress distribution, and a larger magnitude residual stress is reduced and homogenized, the reduction and homogenization effects are particularly remarkable for components that have been introduced more residuals stress to surface and interior by welding and milling processes. Meanwhile, it realizes the control of the overall deformation of the component to be regulated during the regulation process, which makes it difficult to deform and has remarkable control deformation effects particularly for the component to be regulated that is made of aluminum alloy and is more easily deformed.

The above is only some embodiments of the present disclosure and is not intended to limit the present disclosure. Any modifications, equivalent replacements, improvements and likes made by those skilled in the art within the spirit and principles of the present disclosure should be included in the scope of protection of the present disclosure.

What is claimed is:

1. A device for reducing and homogenizing residual stress of a component by array of high-energy elastic waves, comprising:
   a tubular body consisting of at least two elements connected in a longitudinal section, the tubular body being arranged around a component to be regulated, wherein multiple first through holes are provided on sidewall of the tubular body along a circumferential direction and forms an array arrangement, and a clamping device pressing against outer surface of the tubular body is provided on outer side of the tubular body;
   exciting wedges configured to be embedded at the first through holes, wherein an end face of each of the exciting wedges facing interior of the tubular body is closely coupled to a surface of the component to be regulated, an end face of each of the exciting wedges facing the first through hole is a connection portion, which has a concave surface and a connection bar protruding from center of the concave surface;
   exciters connected by at least parts of the exciting wedges correspondingly, wherein an emitting end of each of the exciters is coupled to the concave surface and the connection bar of the connection portion via a coupling agent, a blind hole to be connected with the connection bar is provided at a center of the emitting end, an axis of the emitting end of each of the exciters coincides with a normal line at a corresponding pressed surface of the component to be regulated;
   a multi-channel signal amplifier electrically connected to each of the exciters, configured for fidelity amplifying emitted signals and received signals; and
   a multi-channel excitation control module electrically connected to the multi-channel signal amplifier, configured for controlling the exciters to emit the emitted signals and obtain the received signals.

2. The device according to claim 1, wherein a space is provided between two adjacent elements of the elements.

3. The device according to claim 1 or 2, wherein the clamping device comprises at least two sets of pressing brackets and bolts, and sides of the pressing brackets facing an outer wall of the tubular body are provided with a plurality of threaded holes matching the bolts.

4. The device according to claim 3, wherein the tubular body is provided on an operation deck, the pressing brackets are right-angle brackets, one straight side of each of the right-angle brackets is provided with threaded holes matched with and connected to the bolts, and the other straight side of each of the right-angle brackets is supported and fixedly connected to the operation deck.

5. The device according to claim 3, wherein the sets of pressing brackets are evenly arranged around the tubular body; and/or
   the elements of the tubular body have a central symmetrical arrangement.

6. The device according to claim 1, wherein the connection portion is a structure in which an outer edge is protruding and an inner part is recessed, the outer edge is arranged around an outer periphery of the first through hole, and the outer edge is evenly provided with a plurality of second through holes, so that the exciting wedges are fixedly connected to an inner wall of the tubular body via fasteners.

7. The device according to claim 1, wherein curvature of the end face of each of the exciting wedges facing the component to be regulated and curvature of the surface, correspondingly coupled thereto, of the component to be regulated are the same.

8. The device according to claim 1, wherein a coupling agent made of a high-temperature grease material is provided between the end face of each of the exciting wedges facing the interior of the tubular body and the surface of the component to be regulated; and/or the coupling agent made of the high-temperature grease material is provided between the emitting end of each of the exciters and the concave surface of the connection portion.

9. The device according to claim 1, wherein a sound wave frequency of each of the exciters is greater than 0.1 KHz; and/or a sound wave power of each of exciters is greater than 0.1 W.

\* \* \* \* \*